United States Patent
Shi et al.

(10) Patent No.: US 11,985,026 B2
(45) Date of Patent: May 14, 2024

(54) PROCESSING METHOD AND DEVICE FOR LINK RECOVERY PROCESS, AND TERMINAL

(71) Applicant: GUANGDONG OPPO MOBILE TELECOMMUNICATIONS CORP., LTD., Guangdong (CN)

(72) Inventors: Zhihua Shi, Guangdong (CN); Wenhong Chen, Guangdong (CN); Yun Fang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 631 days.

(21) Appl. No.: 17/188,614

(22) Filed: Mar. 1, 2021

(65) Prior Publication Data

US 2021/0184919 A1    Jun. 17, 2021

Related U.S. Application Data

(63) Continuation of application No. PCT/CN2018/105813, filed on Sep. 14, 2018.

(51) Int. Cl.
    *H04L 12/24* (2006.01)
    *H04L 5/00* (2006.01)
    *H04L 41/0654* (2022.01)
    *H04W 24/08* (2009.01)
    *H04W 72/04* (2023.01)
    *H04W 72/23* (2023.01)

(52) U.S. Cl.
    CPC ........ *H04L 41/0654* (2013.01); *H04L 5/0048* (2013.01); *H04W 24/08* (2013.01); *H04W 72/23* (2023.01)

(58) Field of Classification Search
    CPC .. H04L 41/0654; H04L 5/0048; H04W 72/23; H04W 24/08
    See application file for complete search history.

(56) References Cited

U.S. PATENT DOCUMENTS 10,980,062 B1 * 4/2021 Babaei ................ H04L 1/1841
11,489,579 B2 * 11/2022 Takeda ................ H04W 76/19
(Continued)

FOREIGN PATENT DOCUMENTS

CN    108401295 A    8/2018
GB    2575691 A    1/2020
(Continued)

OTHER PUBLICATIONS

Mediatek Inc., "Summary #1 on Remaining issues on Beam Failure Recovery," 3GPP TSG RAN WG1 Meeting #94, R1-1809805, Aug. 2018, 29 pages.
(Continued)

*Primary Examiner* — Bailor C Hsu
(74) *Attorney, Agent, or Firm* — Hodgson Russ LLP (57) ABSTRACT

Embodiments of the present disclosure provide a processing method and device for a link recovery procedure, and a terminal. The method comprises: a terminal determining that there is no need to monitor a downlink control channel on a first cell; and the terminal skipping a link recovery procedure, or the terminal determining a set of reference signals and executing, on the basis of the set of reference signals, a link recovery procedure.

15 Claims, 3 Drawing Sheets

201
Determining by a terminal that monitoring of a downlink control channel on a first cell is not required 202
Not expecting, by the terminal, information related to the link recovery procedure configured by a network side; not performing the link recovery procedure by the terminal; or determining a set of reference signals by the terminal and performing the link recovery procedure based on the set of reference signals (56) References Cited

U.S. PATENT DOCUMENTS

| | | | |
|---|---|---|---|
| 11,569,896 B2* | 1/2023 | Yang | H04B 7/088 |
| 2018/0191422 A1* | 7/2018 | Xia | H04B 7/0834 |
| 2018/0279287 A1* | 9/2018 | John Wilson | H04W 16/28 |
| 2018/0302889 A1* | 10/2018 | Guo | H04B 17/309 |
| 2019/0037498 A1* | 1/2019 | Tseng | H04W 72/046 |
| 2019/0053293 A1* | 2/2019 | Akoum | H04W 72/23 |
| 2019/0075014 A1* | 3/2019 | Zhou | H04W 74/0833 |
| 2019/0098520 A1* | 3/2019 | Kim | H04B 7/0404 |
| 2019/0190582 A1* | 6/2019 | Guo | H04L 1/0061 |
| 2019/0215896 A1* | 7/2019 | Zhou | H04L 1/0027 |
| 2019/0245737 A1* | 8/2019 | Zhou | H04B 7/06 |
| 2020/0413395 A1* | 12/2020 | Chen | H04W 72/563 |
| 2021/0135713 A1* | 5/2021 | Kang | H04W 72/046 |

FOREIGN PATENT DOCUMENTS

| | | |
|---|---|---|
| WO | 2018129300 | 7/2018 |
| WO | 2018141303 | 8/2018 |

OTHER PUBLICATIONS

OPPO, "Text proposals for beam management," 3GPP TSG RAN WG1 Meeting #94, R1-1808886, Aug. 2018, 7 pages.
WIPO, ISR for PCT/CN2018/105813, dated May 17, 2019.
WIPO, WO for PCT/CN2018/105813, dated May 17, 2019.
CNIPA, First Office Action for CN Application No. 201880096581. X, dated Nov. 3, 2022.

* cited by examiner

PROCESSING METHOD AND DEVICE FOR LINK RECOVERY PROCESS, AND TERMINAL

CROSS-REFERENCE

This application is a continuation of International Patent Application No. PCT/CN2018/105813, filed Sep. 14, 2018, the entire disclosure of which is incorporated herein by reference.

TECHNICAL FIELD

The embodiments of the present disclosure relate to the field of mobile communication technologies, and in particular to a processing method and device for a link recovery procedure, and a terminal.

BACKGROUND

In New Radio (NR) Rel-15, a Beam Failure Recovery (BFR) procedure, which is also referred to as a link recovery procedure, is defined. In the BFR procedure, a terminal will perform a beam failure detection step in which the terminal determines whether a corresponding Physical Downlink Control Channel (PDCCH) meets a threshold by measuring a reference signal.

In the design of Rel-15, only one Serving Cell is considered in the beam failure recovery procedure, and multiple Serving Cells in Carrier Aggregation (CA) are not taken into consideration. In this case, how to deal with the BFR procedure is to be resolved.

SUMMARY

Embodiments of the present disclosure provide a processing method and device for a link recovery procedure, and a terminal.

A processing method for a link recovery procedure according to the embodiments of the present disclosure includes:

determining by a terminal that monitoring of a downlink control channel on a first cell is not required; and not expecting, by the terminal, information related to the link recovery procedure configured by a network side;

not performing the link recovery procedure by the terminal; or, the terminal, based on first configuration of the network side A processing device for a link recovery procedure according to the embodiments of the present disclosure includes:

a determining unit configured to determine that monitoring of a downlink control channel on a first cell is not required;

a processing unit configured to not expect information related to the link recovery procedure configured by a network side; not perform the link recovery procedure; or determine a set of reference signals and perform the link recovery procedure based on the set of reference signals.

A terminal according to the embodiments of the present disclosure includes a processor and a memory. The memory is used for storing a computer program, and the processor is configured to invoke and run the computer program stored in the memory to perform the processing method for the link recovery procedure as described above.

A chip according to the embodiments of the present disclosure is configured to implement the processing method for the link recovery procedure as described above.

Specifically, the chip includes a processor configured to invoke and run a computer program from a memory, to cause a device installed with the chip to perform the processing method for the link recovery procedure as described above.

A computer-readable storage medium according to the embodiments of the present disclosure is used for storing a computer program which causes a computer to perform the processing method for the link recovery procedure as described above.

A computer program product according to the embodiments of the present disclosure includes computer program instructions which cause a computer to perform the processing method for the link recovery procedure as described above.

A computer program according to the embodiments of the present disclosure, when running on a computer, causes the computer to perform the processing method for link recovery procedure as described above.

BRIEF DESCRIPTION OF THE DRAWINGS

The drawings illustrated herein are used to provide a further understanding of the present disclosure and constitute a part of the present disclosure. The exemplary embodiments and descriptions of the present disclosure are used to explain the present disclosure, and do not constitute an improper limitation of the present disclosure. In the drawings.

DETAILED DESCRIPTION

The technical solutions in the embodiments of the present disclosure will be described below in conjunction with the drawings in the embodiments of the present disclosure. Obviously, the described embodiments are part of the embodiments of the present disclosure, but not all the embodiments. Based on the embodiments in the present disclosure, all other embodiments obtained by those of ordinary skill in the art without creative work fall within the protection scope of the present disclosure.

The technical solutions of the embodiments of the present disclosure can be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, a LTE Frequency Division Duplex (FDD) system, a LTE Time Division Duplex (TDD) system, a Universal Mobile Telecommunication System (UMTS), a Worldwide Interoperability for Microwave Access (WiMAX) communication system, a 5G system, etc.

Figure 1:
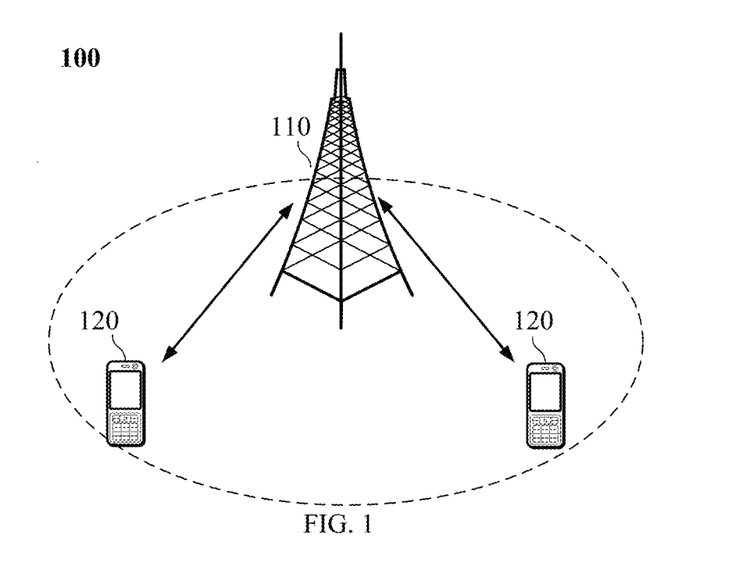
FIG. 1 is a schematic diagram of a communication system architecture according to an embodiment of the present disclosure.

For example, a communication system to which the embodiments of the present disclosure are applied is as shown in FIG. 1. The communication system 100 may include a network device 110 which may be a device that communicates with a terminal 120 (or referred to as a communication terminal or a terminal). The network device 110 can provide communication coverage for a specific geographic area, and can communicate with terminals located in the coverage area. Optionally, the network device 110 can be a Base Transceiver Station (BTS) in a GSM system or a CDMA system, a NodeB (NB) in a WCDMA system, an Evolutional Node B (eNB or eNodeB) in a LTE system, or a wireless controller in a Cloud Radio Access Network (CRAN). Optionally, the network device can be a mobile switching center, a relay station, an access point, an on-board device, a wearable device, a hub, a switch, a bridge, a router, a network side device in the 5G network, a network device in future evolutional Public Land Mobile Network (PLMN), or the like The communication system 100 also includes at least one terminal 120 located within the coverage range of the network device 110. As used herein, the terminal includes, but is not limited to, a device configured to receive/send communication signals and/or an Internet of Things (IoT) device, which may be connected with another device via wired lines, such as Public Switched Telephone Networks (PSTN), Digital Subscriber Line (DSL), digital cables, and direct cable connections; via another data connection/network; and/or via a wireless interface, such as cellular networks, wireless local area networks (WLAN), digital TV networks such as DVB-H networks, satellite networks and AM-FM broadcast transmitters. A terminal configured to communicate through a wireless interface may be referred to as a "wireless communication terminal", a "wireless terminal" or a "mobile terminal". Examples of the mobile terminal include but are not limited to satellite or cellular phones; Personal Communications System (PCS) terminals that can combine cellular radio phones with data processing, fax, and data communication capabilities; PDA that may include a radio phone, a pager, Internet/intranet access, a Web browser, a memo pad, a calendar, and/or a Global Positioning System (GPS) receiver; and conventional laptop and/or palmtop receivers or other electronic devices including radio telephone transceivers. The terminal device may refer to access terminals, user equipment (UE), user units, user stations, mobile stations, mobile sites, remote stations, remote terminals, mobile equipment, user terminals, terminals, wireless communication equipment, user agents, or user devices. The access terminal may be a cellular phone, a cordless phone, a Session Initiation Protocol (SIP) phone, a Wireless Local Loop (WLL) station, a Personal Digital Assistant (PDA), a wireless communication functional handheld device, a computing device or other processing devices connected to wireless modems, an in-vehicle device, a wearable device, a terminal in a 5G network, a terminal in the future evolution of PLMN, or the like.

Optionally, Device to Device (D2D) communication may be performed between the terminals 120.

Optionally, the 5G system or 5G network may also be referred to as a New Radio (NR) system or NR network.

FIG. 1 exemplarily shows one network device and two terminals. Optionally, the communication system 100 may include multiple network devices and other numbers of terminals can be included in the coverage of each network device, which is not particularly limited in the embodiments of the present disclosure.

Optionally, the communication system 100 may also include other network entities such as a network controller and a mobility management entity, which are not limited in the embodiments of the present disclosure.

It should be understood that the device with a communication function in the network and/or system of the embodiments of the present disclosure may be referred to as the communication device. Taking the communication system 100 shown in FIG. 1 as an example, the communication device may include a network device 110 and a terminal 120 which have the communication function. The network device 110 and the terminal 120 may be the specific devices as described above, which will not be repeated here. The communication device may also include other devices in the communication system 100, such as a network controller, a mobility management entity, and other network entities, which are not limited in the embodiments of the present disclosure.

It should be understood that the terms "system" and "network" are often used interchangeably herein. The term "and/or" used herein is merely to describe relative relationships of relative objects, indicating that there can be three kinds of relationships. For example, A and/or B can indicate three cases where A exists alone, A and B exist simultaneously, or B exists alone. In addition, the character "/" used herein generally indicates that the related objects before and after this character are in an "or" relationship.

In order to facilitate understanding of the technical solutions of the embodiments of the present disclosure, related technologies involved in the embodiments of the present disclosure are described below.

For a Dual Connectivity (DC) system, there are a Master Cell Group (MCG) and a Secondary Cell Group (SCG) that provide services for the terminal, where the MCG includes PCells and SCells, and the SCG includes PSCells and SCells. Here, the PCell refers to the master cell in the MCG, and the PSCell refers to the master cell in the SCG. PCell and PSCell can be collectively referred to as a special cell (SpCell).

In Rel-15, the BFR procedure includes the following steps:

1) Beam Failure Detection

User equipment (UE) determines whether a quality of a corresponding PDCCH meets a predetermined or configured threshold by measuring a Channel State Information Reference Signal (CSI-RS) and/or a Synchronization Signal Block (SSB, SS/PBCH Block).

Herein, the quality of the PDCCH may be indicated by, for example, a hypothetical Block Error Rate (BLER).

2) New Candidate Beam Identification

The UE selects a new beam that meets the predetermined or configured threshold based on the measurement result of the CSI-RS and/or SSB.

Here, the measurement result can be at least one of a Layer 1-Reference Signal Receiving Power (L1-RSRP), a Layer 1-Reference Signal Receiving Quality (L1-RSRQ), and a Layer1-Signal to Interference plus Noise Ratio (L1-SINR).

2.1) If a new beam that meets the predetermined/configured threshold is selected, step 3) is performed; and 2.2) If the new beam that meets the predetermined/configured threshold is not selected, a contention-based Random Access process is adopted.

3) Beam Failure Recovery Request Transmission

The UE selects a Physical Random Access Channel (PRACH) corresponding to the new beam to transmit a signal to the network, or reports the selected new beam through a Physical Uplink Control Channel (PUCCH).

4) UE Detects a Response of the Network

The UE detects the response to the beam failure recovery request returned by the base station.

It should be noted that the above steps 2) to 4) may be repeated by the UE according to the specific network configurations.

Through the above step 1), it can be determined whether the beam failure has occurred. The beam failure is determined based on the quality of the beam associated with the PDCCH, and the quality of the beam is determined by a reference signal corresponding to the beam. For example, the reference signal includes the CSI-RS and/or SSB.

In order to perform the beam failure detection, the UE measures the reference signal corresponding to the PDCCH, such as the CSI-RS and/or SSB. The reference signal required by the UE is currently configured in two ways:

1) Explicit Configuration

The network explicitly configures a set of Reference Signals (RS) for the UE to be used by the UE as measurement signals for the beam failure detection.

2) Implicit Configuration

If the network does not explicitly configure a set of RSs, the UE itself determines the set of RSs according to a Quasi Co-Location (QCL) to be used as the measurement signals for the beam failure detection.

For a Carrier Aggregation (CA) system, a Cross-Carrier Scheduling scheme can be used. For example, a Physical Downlink Shared Channel (PDSCH) on a first carrier (corresponding to the Serving Cell) is scheduled based on the PDCCH on a second carrier, and there may be no PDCCH on the first carrier that is to be monitored by the terminal. Therefore, there may be a case where there is no PDCCH on some CCs in the CA, especially on the SCell, that is to be monitored by the UE. In the embodiments of the present disclosure, such kind of cell is called the first cell, that is, it is not necessary for the terminal to monitor the PDCCH on this kind of first cell. In the embodiments of the present disclosure, there is proposed a processing method for the link recovery procedure for this kind of first cell. It should be noted that the link recovery procedure may also be referred to as a BFR procedure. In addition, the first cell also corresponds to the first carrier, and the description of the first cell in the following embodiments of the present disclosure may also be replaced with the description of the first carrier.

Figure 2:
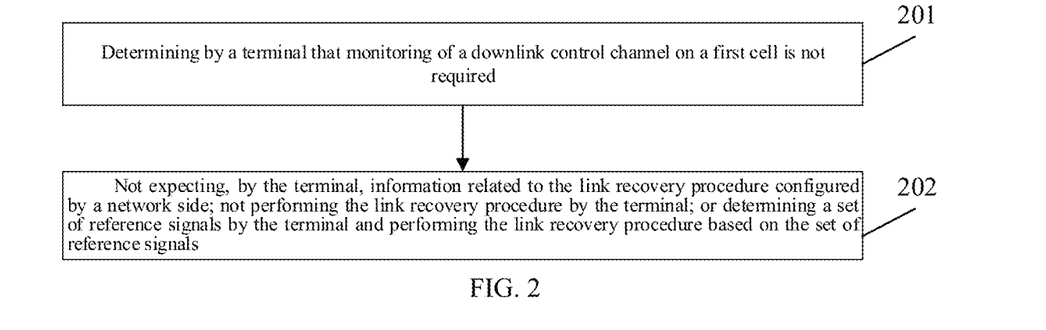
FIG. 2 is a schematic flowchart of a processing method for a link recovery procedure according to an embodiment of the present disclosure.

FIG. 2 is a schematic flowchart of a processing method for a link recovery procedure according to an embodiment of the present disclosure. As shown in FIG. 2, the processing method for the link recovery procedure includes the following steps.

In step 201, a terminal determines that monitoring of a downlink control channel on a first cell is not required.

In the embodiments of the present disclosure, the terminal may be any device capable of communicating with a network, such as a mobile phone, a tablet computer, an on-vehicle terminal, a notebook, a wearable terminal, and the like.

It should be understood that where it is necessary for the terminal to monitor the PDCCH on a carrier/bandwidth part (BWP), the following two configurations need to be met.

1. The network has configured one or more CORESETs for the UE;

Here, the CORESET defines a resource block, including frequency domain location information and time domain length information of the resource block.

2. The network configures one or more search spaces for the UE, where one CORESET is associated with one or more search spaces.

Here, the search space defines a period of the resource block in the time domain on the basis of the CORESET, and a time domain position of the resource block in each period, such as a start position and/or an end position in the time domain.

The UE can determine a downlink resource based on the CORESET and the search space associated therewith, and monitor the PDCCH on the downlink resource.

In addition, for a certain carrier (or a certain cell), if it is necessary for the UE to monitor the PDCCH on this cell, the network can configure information related to the link recovery procedure (also known as BFR related information) for the UE, and the UE can perform the link recovery procedure according to the configuration.

In the embodiments of the present disclosure, there may be the following situations where the terminal determines that the monitoring of the downlink control channel on the first cell is not required.

Situation 1: When the terminal determines that a first control resource set for the terminal is not configured by the network side, the terminal determines that it is not necessary to monitor the downlink control channel on the first cell, where the first control resource set is a control resource set other than a second control resource set, and the second control resource set is used for the terminal to receive downlink signal transmission for a corresponding response from the network during the link recovery procedure.

Specifically, the first control resource set is referred to as a CORESET-BFR, and the second control resource set is referred to as a CORESET other than the CORESET-BFR. The CORESET-BFR is a special CORESET which is dedicated to the BFR and is used from the step 4) of the BFR procedure, and will continue to be used after the BFR is successful, until the network updates the related configuration. The CORESET mentioned below in the embodiments of this application refers to the CORESET other than the CORESET-BFR unless otherwise specified.

In the case where the network does not configured the CORESET (the CORESET other than the CORESET-BFR, and accordingly, there is no CORESET-based search space), it is not necessary for the UE to monitor the PDCCH on the first cell.

Situation 2: When the terminal determines that the first control resource set for the terminal is configured and a search space associated with the first control resource set is not configured by the network side, the terminal determines that it is not necessary to monitor the downlink control channel on the first cell, where the first control resource set is a control resource set other than a second control resource set, and the second control resource set is used for the terminal to receive the downlink signal transmission for a corresponding response from the network during the link recovery procedure.

Specifically, in the case where the network configures the CORESET (CORESET other than CORESET-BFR) but does not configure the CORESET-based Search space, it is not necessary for the UE to monitor the PDCCH on the first cell.

Situation 3: When the terminal determines that the first control resource set for the terminal and the search space associated with the first control resource set are configured by the network side, but the terminal is not activated by the network side to monitor the search space, the terminal determines that it is not necessary to monitor the downlink control channel on the first cell, where the first control resource set is a control resource set other than a second control resource set, and the second control resource set is used for the terminal to receive the downlink signal transmission corresponding to the corresponding response of the network during the link recovery procedure.

Specifically, in the case where the network configures the CORESET (CORESET other than CORESET-BFR) and the CORESET-based search space, but does not activate the UE to monitor the corresponding search space, it is not necessary for the UE to monitor the PDCCH on the first cell.

In step 202, the terminal does not expect information related to the link recovery procedure configured by the network side, the terminal does not perform the link recovery procedure, or the terminal determines a set of reference signals and performs the link recovery procedure based on the set of reference signals.

1) When the terminal determines that it is not necessary to monitor the downlink control channel on the first cell based on any one of the above situations 1, 2, and 3, the terminal does not perform the link recovery procedure, that is, the BFR procedure. Further, in the case where the terminal does not perform the link recovery procedure, the terminal does not expect information related to the link recovery procedure configured by the network side. Herein, the information related to the link recovery procedure may be BFR related parameters/processes which are configured by the network side.

It should be noted that the terminal does not expect the information related to the link recovery procedure configured by the network side, which does not indicate that the network side does not configure the information related to the link recovery procedure, and regardless of whether the network side configures the information related to the link recovery procedure or not, the terminal does not perform the link recovery procedure.

2) When the terminal determines that it is not necessary to monitor the downlink control channel on the first cell based on any one of the above situations 1, 2, and 3, the terminal obtains a set of reference signals configured on the network side, measures a quality of at least one reference signal in the set of reference signals during the link recovery procedure, and determines whether a link failure occurs based on the quality of the at least one reference signal.

Specifically, when it is not necessary for the UE to monitor the PDCCH on the first cell, the UE can also support the BFR function, but for the step 1) of the BFR procedure, the set of reference signals should be configured in the explicit configuration method. Specifically, the network side configures, through higher layer signaling, the set of RSs for the UE to be used by the UE as the measurement signals for the beam failure detection. The higher layer signaling can carry a parameter of failureDetectionResources, which is used to indicate a set of RSs. Herein, the RS can be the CSI-RS and/or SSB.

3) When the terminal determines that it is not necessary to monitor the downlink control channel on the first cell based on the above situation 2, in the case where the network side configures the set of reference signals, the terminal does not perform the link recovery procedure, or in the case where the network side does not configure the set of reference signals, the terminal does not perform the link recovery procedure, where at least one reference signal in the set of reference signals is used for the signal measurement in the link recovery procedure.

Here, the set of reference signals can be understood with reference to the description in 2) above, that is, the network explicitly configures the set of reference signals (RSs) for the UE to be used by the UE as the measurement signals for the beam failure detection.

4) When the terminal determines that it is not necessary to monitor the downlink control channel on the first cell based on any one of the above situations 2 and 3, the terminal determines the set of reference signals based on a Transmission Configuration Indicator state (TCI state) corresponding to the first control resource set configured on the network side, measures a quality of at least one reference signal in the set of reference signals during the link recovery procedure, and determine, based on the quality of the at least one reference signal, whether the link failure occurs.

Further, there are one or more TCI states corresponding to the first control resource set, and if the first control resource set corresponds to a plurality of TCI states, the terminal selects one TCI state from the plurality of TCI states to determine the set of reference signals. In one embodiment, the terminal selects the TCI state at a first position from the plurality of TCI states. In another embodiment, the terminal selects the TCI state with a smallest TCI state identification from the plurality of TCI states (the terminal selects the TCI state at the first position from the plurality of TCI states or selects the TCI state with the smallest TCI state ID from the plurality of TCI states).

Here, the network side configures the plurality of TCI states for the terminal, and each TCI state corresponds to a piece of identification information (TCI state ID). The TCI state at the first position can be selected from the plurality of TCI state positions to determine the set of RSs, or the TCI state with the smallest TCI state ID can be selected to determine the set of RSs.

Specifically, when it is not necessary for the UE to monitor the PDCCH on the first cell, but the network device configures the CORESET (and does not configure the search space), the UE can support the BEF procedure. In specific, the UE determines, based on a TCI state corresponding to the CORESET configured by the network side, a set of SRs, that is, $\bar{q}_0$. Further, if the number of the TCI states configured for one CORESET exceeds 1, the UE selects one TCI state therefrom based on certain rules to determine $\bar{q}_0$.

In the above solutions of the embodiments of the present disclosure, the type of the reference signal is not limited, and for example, it may be the CSI-RS and/or SSB, etc. Further, the measured quality of the reference signal may be determined by at least one of the following parameters: a hypothetical BLER, a L1-RSRP, a L1-RSRQ and a L1-SINR.

In the technical solutions of the embodiments of the present disclosure, if the terminal determines that it is not necessary to monitor the downlink control channel on the first cell, the terminal does not perform the link recovery procedure; or the terminal determines a set of reference signals and performs the link recovery procedure based on the set of reference signals, where the set of reference signals can be configured in the explicit configuration method, and when the CORESET is configured, the implicit configuration method can also be adopted, thereby improving the performance of the link recovery.

Figure 3:
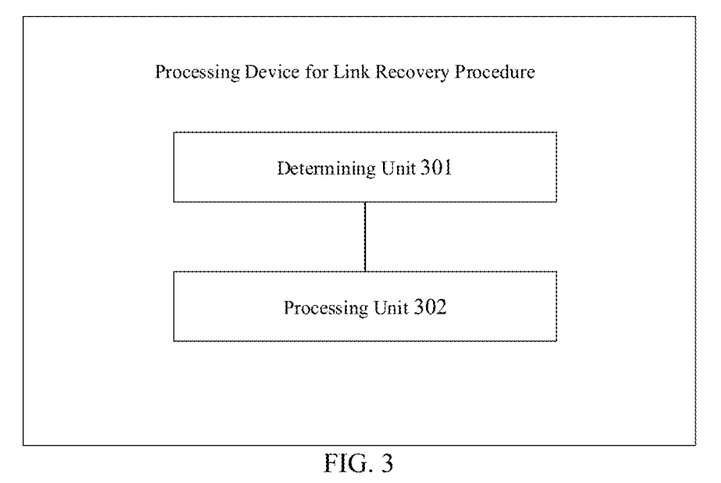
FIG. 3 is a schematic structural diagram of a processing device for a link recovery procedure according to an embodiment of the present disclosure.

FIG. 3 is a schematic structural diagram of a processing device for a link recovery procedure according to an embodiment of the present disclosure. The device includes:

a determining unit 301 configured to determine that monitoring of a downlink control channel on a first cell is not required; and a processing unit 302 configured to not expect information related to the link recovery procedure configured by a network side; not perform the link recovery procedure; or determine a set of reference signals and perform the link recovery procedure based on the set of reference signals.

In an embodiment, the determining unit 301 is configured to determine that it is not necessary to monitor the downlink control channel on the first cell when it is determined that a first control resource set for the terminal is not configured by the network side, where the first control resource set is a control resource set other than a second control resource set, and the second control resource set is used for the terminal to receive downlink signal transmission for a corresponding response from the network during the link recovery procedure.

In an embodiment, the determining unit 301 is configured to determine that it is not necessary to monitor the downlink control channel on the first cell when it is determined that a first control resource set for the terminal is configured and a search space associated with the first control resource set is not configured by the network side, where the first control resource set is a control resource set other than a second control resource set, and the second control resource set is used for the terminal to receive downlink signal transmission for a corresponding response from the network during the link recovery procedure.

In an embodiment, the determining unit 301 is configured to determine that it is not necessary to monitor the downlink control channel on the first cell when it is determined that a first control resource set for the terminal and a search space associated with the first control resource set are configured by the network side and the terminal is not activated by the network side to monitor the search space, where the first control resource set is a control resource set other than a second control resource set, and the second control resource set is used for the terminal to receive downlink signal transmission for a corresponding response from the network during the link recovery procedure.

In an embodiment, when the processing unit 302 is configured to not perform the link recovery procedure, the terminal does not expect the information related to the link recovery procedure configured by the network side.

In an embodiment, the processing unit 302 is configured to obtain a set of reference signals configured on the network side, measure a quality of at least one reference signal in the set of reference signals during the link recovery procedure, and determine whether a link failure occurs based on the quality of the at least one reference signal.

In an embodiment, when the set of reference signals is configured on the network side, the processing unit 302 does not perform the link recovery procedure; or when the set of reference signals is not configured on the network side, the processing unit 302 does not perform the link recovery procedure, where at least one reference signal in the set of reference signals is used for signal measurement in the link recovery procedure.

In an embodiment, the processing unit 302 is configured to determine the set of reference signals based on the first control resource set configured on the network side, measure the quality of at least one reference signal in the set of reference signals during the link recovery procedure, and determine whether a link failure occurs based on the quality of the at least one reference signal.

In an embodiment, there are one or more TCI states corresponding to the first control resource set, and if the first control resource set corresponds to a plurality of TCI states, the processing unit 302 is configured to select a TCI state from the plurality of TCI states to determine the set of reference signals.

In an embodiment, the processing unit 302 selects the TCI state at a first position from the plurality of TCI states, or selects the TCI state with a smallest TCI state identification from the plurality of TCI states.

Those skilled in the art should understand that the relevant description of the above processing device for the link recovery procedure according to the embodiments of the present disclosure can be understood with reference to the relevant description of the processing method for the link recovery procedure in the embodiments of the present disclosure.

Figure 4:
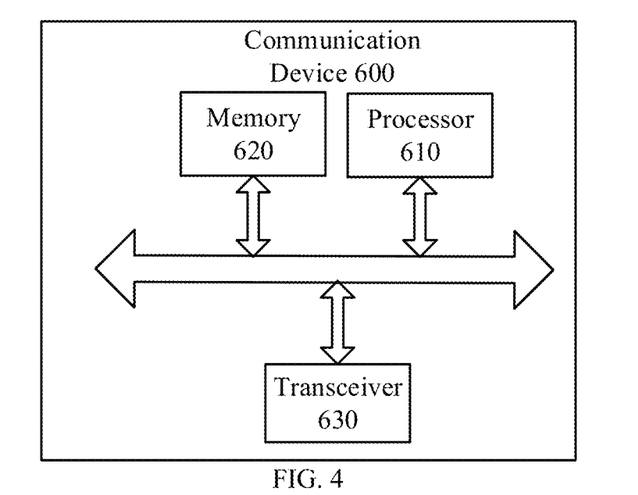
FIG. 4 is a schematic structural diagram of a communication device according to an embodiment of the present disclosure.

FIG. 4 is a schematic structural diagram of a communication device 600 according to an embodiment of the present disclosure. The communication device can be a terminal. The communication device 600 shown in FIG. 4 includes a processor 610 which can invoke and execute a computer program from a memory to carry out the methods in the embodiments of the present disclosure.

Optionally, as shown in FIG. 4, the communication device 600 can further include a memory 620. The processor 610 can invoke and run the computer program from the memory 620 to carry out the methods in the embodiments of the present disclosure.

The memory 620 can be a separate device independent of the processor 610, or can be integrated in the processor 610.

Optionally, as shown in FIG. 4, the network device 600 can further include a transceiver 630, and the processor 610 can control the transceiver 630 to communicate with other devices, and specifically to transmit information or data to other devices, or receive information or data transmitted from other devices.

The transceiver 630 can include a transmitter and a receiver. The transceiver 630 can further include one or more antennas.

Optionally, the communication device 600 can specifically be a network device in the embodiments of the present disclosure, and can carry out the corresponding processes implemented by the network device in the methods according to the embodiments of the present disclosure, which will not be repeated here for the sake of brevity.

Optionally, the communication device 600 can specifically be a mobile terminal/terminal in the embodiments of the present disclosure, and can carry out the corresponding processes implemented by the mobile terminal/terminal in the methods according to the embodiments of the present disclosure, which will not be repeated here for the sake of brevity.

Figure 5:
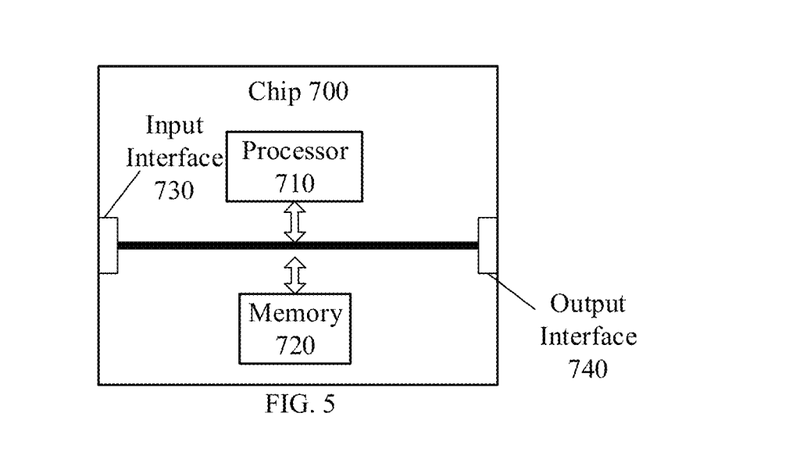
FIG. 5 is a schematic structural diagram of a chip according to an embodiment of the present disclosure.

FIG. 5 is a schematic structural diagram of a chip according to an embodiment of the present disclosure. The chip 700 shown in FIG. 5 includes a processor 710 which can invoke and run a computer program from a memory to carry out the methods according to the embodiments of the present disclosure.

Optionally, as shown in FIG. 5, the chip 700 can further include a memory 720. The processor 710 can invoke and run the computer program from the memory 720 to carry out the methods according to the embodiments of the present disclosure.

The memory 720 can be a separate device independent of the processor 710, or can be integrated in the processor 710.

Optionally, the chip 700 can further include an input interface 730. The processor 710 can control the input interface 730 to communicate with other devices or chips, and particularly to obtain information or data transmitted by other devices or chips.

Optionally, the chip 700 can further include an output interface 740. The processor 710 can control the output interface 740 to communicate with other devices or chips, and particularly to output information or data to other devices or chips.

Optionally, the chip can be applied to the network device in the embodiments of the present disclosure, and can carry out the corresponding processes implemented by the network device in the methods of the embodiments of the present disclosure, which will not be repeated here for the sake of brevity.

Optionally, the chip can be applied to the mobile terminal/terminal in the embodiments of the present disclosure, and can implement the corresponding processes implemented by the mobile terminal/terminal in the methods of the embodiments of the present disclosure, which will not be repeated here for the sake of brevity.

It should be understood that the chip mentioned in the embodiments of the present disclosure can also be referred to as a system-level chip, a system chip, a chip system, or a system-on-chip.

Figure 6:
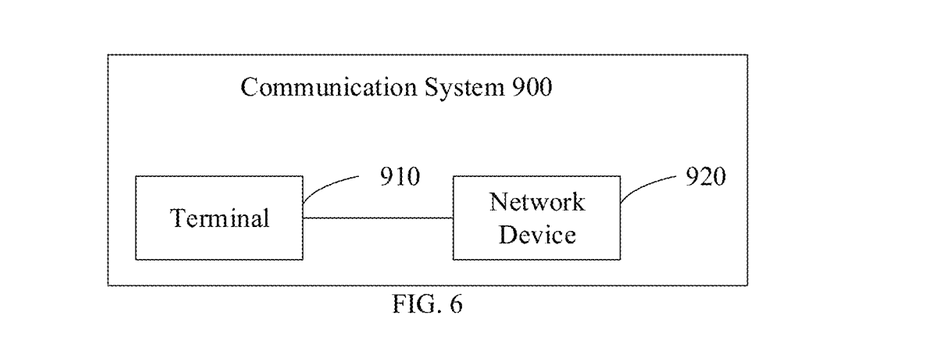
FIG. 6 is a schematic block diagram of a communication system according to an embodiment of the present disclosure.

FIG. 6 is a schematic block diagram of a communication system 900 according to an embodiment of the present disclosure. As shown in FIG. 6, the communication system 900 includes a terminal 910 and a network device 920.

The terminal 910 can be configured to implement the corresponding functions implemented by the terminal in the above methods, and the network device 920 can be configured to implement the corresponding functions implemented by the network device in the above methods, which will not be repeated here for the sake of brevity.

With the above technical solutions, the processing scheme for the link recovery procedure is determined for the first cell in which monitoring of the downlink control channel is not required, such as one or some secondary cells (SCell), where the link recovery procedure can also be called a BFR procedure, thereby improving performance of the link recovery (or the BFR).

It should be understood that the processor of the embodiments of the present disclosure can be an integrated circuit chip with signal processing capabilities. In the implementations, the steps of the foregoing method embodiments can be performed by an integrated logic circuit of hardware in the processor or by instructions in a form of software. The foregoing processor can be a general-purpose processor, a Digital Signal Processor (DSP), an Application Specific Integrated Circuit (ASIC), a Field Programmable Gate Array (FPGA), another programmable logic device, discrete gate or transistor logic device, or a discrete hardware component, which can implement the methods, steps, and logical blocks disclosed in the embodiments of the present disclosure. The general-purpose processor can be a microprocessor, any conventional processor or the like. The steps of the methods disclosed in connection with the embodiments of the present disclosure can be directly embodied in and performed by a hardware decoding processor, or can be implemented by a combination of hardware and software modules in the decoding processor. The software modules can be located in a mature storage medium in the art such as a random access memory, a flash memory, a read-only memory, a programmable read-only memory, an electrically erasable programmable memory or a register. The storage medium is located in the memory, and the processor reads information in the memory and implements the steps of the above methods in combination with the hardware thereof.

It can be understood that the memory in the embodiments of the present disclosure may be a volatile memory or a non-volatile memory, or may include both the volatile and non-volatile memories. In an embodiment, the non-volatile memory can be a Read-Only Memory (ROM), a Programmable ROM (PROM), an erasable PROM (EPROM), an electrically EPROM (EEPROM) or a flash memory. The volatile memory may be a Random Access Memory (RAM), which is used as an external cache. By way of exemplary but not restrictive description, many forms of RAMs are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM)) and a Direct Rambus RAM (DR RAM). It should be noted that the memories of the systems and methods described herein are intended to include, but are not limited to, these and any other suitable types of memories.

It should be understood that the foregoing description of the memory is exemplary rather than limiting. For example, the memory in the embodiments of the present disclosure can also be a static RAM (SRAM), a Dynamic RAM (DRAM), a Synchronous DRAM (SDRAM), a Double Data Rate SDRAM (DDR SDRAM), an Enhanced SDRAM (ESDRAM), a Synch-Link DRAM (SLDRAM), a Direct Rambus RAM (DR RAM), among others. That is to say, the memory in the embodiments of the present disclosure is intended to include but is not limited to those and any other suitable types of memories.

The embodiments of the present disclosure also provide a computer-readable storage medium for storing a computer program.

Optionally, the computer-readable storage medium can be applied to the network device in the embodiments of the present disclosure, and the computer program causes a computer to perform the corresponding processes which are implemented by the network device in the methods of the embodiments of the present disclosure, which will not be repeated here for the sake of brevity.

Optionally, the computer-readable storage medium can be applied to the mobile terminal/terminal in the embodiments of the present disclosure, and the computer program causes the computer to perform the corresponding processes which are implemented by the mobile terminal/terminal in the methods of the embodiments of the present disclosure, which will not be repeated here for the sake of brevity.

The embodiments of the present disclosure also provide a computer program product including computer program instructions.

Optionally, the computer program product can be applied to the network device in the embodiments of the present disclosure, and the computer program instructions cause a computer to perform the corresponding processes implemented by the network device in the methods of the embodiments of the present disclosure, which will not be repeated here for the sake of brevity.

Optionally, the computer program product can be applied to the mobile terminal/terminal in the embodiments of the present disclosure, and the computer program instructions cause a computer to perform the corresponding processes implemented by the mobile terminal/terminal in the methods of the embodiments of the present disclosure, which will not be repeated here for the sake of brevity.

The embodiments of the present disclosure also provide a computer program.

Optionally, the computer program can be applied to the network device in the embodiments of the present disclosure, and when running on a computer, the computer program causes the computer to perform the corresponding processes implemented by the network device in the methods of the embodiments of the present disclosure, which will not be repeated here for the sake of brevity.

Optionally, the computer program can be applied to the mobile terminal/terminal in the embodiments of the present disclosure, and when being executed on a computer, causes the computer to perform the corresponding processes implemented by the mobile terminal/terminal in the methods of the embodiments of the present disclosure, which will not be repeated here for the sake brevity.

Those of ordinary skill in the art can recognize that the exemplary units and algorithm steps described in connection with the embodiments disclosed herein can be implemented in electronic hardware or a combination of computer software and the electronic hardware. Whether these functions are implemented in hardware or software depends on the specific applications of the technical solutions and design constraints. Various methods can be used by professional technicians to implement the described functions for each specific application, and such implementations should not be considered as going beyond the scope of the present disclosure.

Those skilled in the art can clearly understand that for the convenience and conciseness of the description, for the specific operating process of the systems, devices and units described above, reference can be made to corresponding process in the foregoing method embodiments, which will not be repeated here.

It should be understood that the systems, devices, and methods disclosed in several embodiments of the present disclosure can be implemented in other manners. For example, the device embodiments described above are merely illustrative. For example, the division of the units is only a logical function division, and in actual implementations, there can be other division manners. For example, a plurality of units or components can be combined or integrated into another system, or some features can be ignored or not implemented. In addition, the coupling or direct coupling or communication connection shown or discussed herein can also be indirect coupling or communication connection through some interfaces, devices or units, and can be in electrical, mechanical or other forms.

The units described as separate components may or may not be physically separated, and the components shown as units may or may not be physical units, that is, they may be located in one place or may be distributed on multiple network units. Some or all of the units can be selected to achieve the objectives of the solutions of the embodiments according to actual requirements.

In addition, the functional units in the embodiments of the present disclosure can be integrated into one processing unit, or each unit can individually exist physically, or two or more of the units can be integrated into one unit.

If implemented in the form of software functional units and sold or used as an independent product, the functions can be stored in a computer-readable storage medium. Based on such understanding, the technical solution of the present disclosure essentially, a part thereof that contributes to the prior art, or a part of the technical solution can be embodied in the form of a software product, and the computer software product is stored in a storage medium and includes instructions which enable a computer device (which may be a personal computer, a server, a network device or the like) to perform all or part of the steps of the methods described in the embodiments of the present disclosure. The foregoing storage medium includes various medium such as a USB drive, a removable hard disk, a ROM, a RAM, a magnetic disk or an optical disc that can store program codes.

Those described above are only specific implementations of the present disclosure, and the protection scope of the present disclosure is not limited thereto. Any alteration or replacement readily devised by a person skilled in the art within the technical scope disclosed in the present disclosure shall fall within the scope of the present disclosure. Therefore, the protection scope of the present disclosure shall be subject to the protection scope of the claims.

What is claimed is:

1. A processing method for a link recovery procedure performed by a terminal, comprising:
   determining, by the terminal, that monitoring of a downlink control channel on a first cell is not required; and
   not expecting, by the terminal, information related to the link recovery procedure configured by a network side; or not performing the link recovery procedure by the terminal; or determining a set of reference signals by the terminal and performing the link recovery procedure based on the set of reference signals,
   wherein the determining by the terminal that the monitoring of the downlink control channel on the first cell is not required comprises:
      determining by the terminal that the monitoring of the downlink control channel on the first cell is not required when the terminal determines that a first control resource set for the terminal is not configured by the network side, wherein the first control resource set is a control resource set other than a second control resource set, and the second control resource set is used for the terminal to receive downlink signal transmission for a corresponding response from the network side during the link recovery procedure;
      determining by the terminal that the monitoring of the downlink control channel on the first cell is not required when the terminal determines that a first control resource set for the terminal is configured by the network side and a search space associated with the first control resource set is not configured by the network side, wherein the first control resource set is a control resource set other than a second control resource set, and the second control resource set is used for the terminal to receive downlink signal transmission for a corresponding response from the network side during the link recovery procedure; or
      determining by the terminal that the monitoring of the downlink control channel on the first cell is not required when the terminal determines that a first control resource set for the terminal and a search space associated with the first control resource set are configured by the network side and the terminal is not activated by the network side to monitor the search space, wherein the first control resource set is a control resource set other than a second control resource set, and the second control resource set is used for the terminal to receive downlink signal transmission for a corresponding response from the network side during the link recovery procedure.

2. The method according to claim 1, wherein the terminal does not expect the information related to the link recovery procedure configured by the network side when the terminal does not perform the link recovery procedure.

3. The method according to claim 1, wherein the determining the set of reference signals by the terminal and performing the link recovery procedure based on the set of reference signals comprises:
   obtaining, by the terminal, the set of reference signals configured on the network side, measuring, by the terminal, a quality of at least one reference signal in the set of reference signals, and determining, by the terminal, whether a link failure occurs or not based on the quality of the at least one reference signal.

4. The method according to claim 1, wherein:
   the terminal does not perform the link recovery procedure when the set of reference signals is configured on the network side; or
   the terminal does not perform the link recovery procedure when the set of reference signals is not configured on the network side,
   wherein at least one reference signal in the set of reference signals is used for signal measurement in the link recovery procedure.

5. The method according to claim 1, wherein the determining the set of reference signals by the terminal and performing the link recovery procedure based on the set of reference signals comprises:
   determining the set of reference signals by the terminal based on a Transmission Configuration Indicator (TCI) state corresponding to the first control resource set configured on the network side, measuring by the terminal a quality of at least one reference signal in the set of reference signals, and determining by the terminal whether a link failure occurs or not based on the quality of the at least one reference signal.

6. The method according to claim 5, wherein the first control resource set corresponds to one or more TCI states, and when the first control resource set corresponds to a plurality of TCI states, the terminal selects a TCI state from the plurality of TCI states to determine the set of reference signals.

7. The method according to claim 6, wherein the terminal selecting the TCI state from the plurality of TCI states comprises:
   selecting, by the terminal, the TCI state at a first position from the plurality of TCI states; or
   selecting, by the terminal, the TCI state with a smallest TCI state identification from the plurality of TCI states.

8. A non-transitory computer-readable storage medium for storing a computer program that causes a computer to perform the method according to claim 1.

9. A terminal device comprising:
   a processor; and
   a memory for storing a computer program,
   wherein the processor is configured to invoke and run the computer program stored in the memory to perform a processing method for a link recovery procedure, the method comprising:
      determining, by the terminal device, that monitoring of a downlink control channel on a first cell is not required; and
      not expecting, by the terminal device, information related to the link recovery procedure configured by a network side; or not performing the link recovery procedure by the terminal device; or determining a set of reference signals by the terminal device and performing the link recovery procedure based on the set of reference signals,
   wherein the determining by the terminal device that the monitoring of the downlink control channel on the first cell is not required comprises:
      determining by the terminal device that the monitoring of the downlink control channel on the first cell is not required when the terminal device determines that a first control resource set for the terminal is not configured by the network side, wherein the first control resource set is a control resource set other than a second control resource set, and the second control resource set is used for the terminal to receive downlink signal transmission for a corresponding response from the network side during the link recovery procedure;
      determining by the terminal device that the monitoring of the downlink control channel on the first cell is not required when the terminal device determines that a first control resource set for the terminal device is configured by the network side and a search space associated with the first control resource set is not configured by the network side, wherein the first control resource set is a control resource set other than a second control resource set, and the second control resource set is used for the terminal to receive downlink signal transmission for a corresponding response from the network side during the link recovery procedure; or
      determining by the terminal device that the monitoring of the downlink control channel on the first cell is not required when the terminal device determines that a first control resource set for the terminal device and a search space associated with the first control resource set are configured by the network side and the terminal device is not activated by the network side to monitor the search space, wherein the first control resource set is a control resource set other than a second control resource set, and the second control resource set is used for the terminal to receive downlink signal transmission for a corresponding response from the network side during the link recovery procedure.

10. The terminal device according to claim 9, wherein the terminal device does not expect the information related to the link recovery procedure configured by the network side when the terminal device does not perform the link recovery procedure.

11. The terminal device according to claim 9, wherein the determining the set of reference signals by the terminal device and performing the link recovery procedure based on the set of reference signals comprises:
   obtaining, by the terminal device, the set of reference signals configured on the network side, measuring, by the terminal, a quality of at least one reference signal in the set of reference signals, and determining, by the terminal device, whether a link failure occurs or not based on the quality of the at least one reference signal.

12. The terminal device according to claim 9, wherein:
   the terminal device does not perform the link recovery procedure when the set of reference signals is configured on the network side; or
   the terminal device does not perform the link recovery procedure when the set of reference signals is not configured on the network side,
   wherein at least one reference signal in the set of reference signals is used for signal measurement in the link recovery procedure.

13. The terminal device according to claim 9, wherein the determining the set of reference signals by the terminal device and performing the link recovery procedure based on the set of reference signals comprises:
   determining the set of reference signals by the terminal device based on a Transmission Configuration Indicator (TCI) state corresponding to the first control resource set configured on the network side, measuring by the terminal device a quality of at least one reference signal in the set of reference signals, and determining by the terminal device whether a link failure occurs or not based on the quality of the at least one reference signal.

14. The terminal device according to claim 13, wherein the first control resource set corresponds to one or more TCI states, and when the first control resource set corresponds to a plurality of TCI states, the terminal selects a TCI state from the plurality of TCI states to determine the set of reference signals.

15. The terminal device according to claim 14, wherein the terminal selecting the TCI state from the plurality of TCI states comprises:
   selecting, by the terminal device, the TCI state at a first position from the plurality of TCI states; or
   selecting, by the terminal device, the TCI state with a smallest TCI state identification from the plurality of TCI states.

\* \* \* \* \*